March 20, 1945.  J. P. MINTON  2,371,973
GEOPHYSICAL PROSPECTING APPARATUS
Filed Jan. 10, 1944   3 Sheets-Sheet 1

John P. Minton.
INVENTOR.
BY Sidney A. Johnson
ATTORNEY.

March 20, 1945.  J. P. MINTON  2,371,973
GEOPHYSICAL PROSPECTING APPARATUS
Filed Jan. 10, 1944  3 Sheets-Sheet 2

John P. Minton,
INVENTOR.
BY Sidney A. Johnson
ATTORNEY.

March 20, 1945.          J. P. MINTON          2,371,973
GEOPHYSICAL PROSPECTING APPARATUS
Filed Jan. 10, 1944          3 Sheets-Sheet 3

John P. Minton.
INVENTOR.
BY Sidney A. Johnson
ATTORNEY.

Patented Mar. 20, 1945

2,371,973

UNITED STATES PATENT OFFICE 2,371,973

GEOPHYSICAL PROSPECTING APPARATUS

John P. Minton, Dallas, Tex., assignor, by mesne assignments, to Socony-Vacuum Oil Company, Incorporated, New York, N. Y., a corporation of New York Application January 10, 1944, Serial No. 517,731

1 Claim. (Cl. 177—352)

This invention relates generally to geophysical prospecting apparatus and more particularly to means for detecting seismic waves.

This application is a continuation-in-part of my application, Serial No. 411,766 filed September 20, 1941, and entitled "Seismographs," now abandoned.

Geophones heretofore known in the art of geophysical prospecting have consisted primarily of three types, the reluctance, the resistance, and the capacity. The resistance type operates under the same principle as that of the carbon button in that it changes the amplitude of a direct current passing through it in sympathy with the seismic waves. The capacity type relies upon the principle of displacement of one of the plates of a condenser relative to the other to vary the capacitance of an alternating current circuit. The resistance type is erratic in operation and the response obtained therefrom is not entirely satisfactory. The capacity type does not produce enough of a change in capacity in response to seismic waves to make it commercially practicable to provide the necessary amplification at each detecting station. The reluctance type includes a permanent magnet, the flux of which embraces one or more coils. Relative movement of the magnet with respect to the coils in response to seismic waves changes air gaps included in the flux paths and the resultant change in the magnetic lines of force cutting the coils generates electric signals corresponding with the seismic waves. Geophones of this type have been reasonably satisfactory but substantial control equipment has been necessary in order to control the amplitude of the detected waves. This equipment has included complicated filter systems adapted to handle extremely low frequency seismic signals as well as volume control systems operating on a time schedule.

In accordance with the present invention, a relatively high frequency current is modulated by the seismic waves. The modulated wave is then amplified by relatively simple equipment and spurious signals eliminated by high frequency filters of relatively simple and inexpensive design. In carrying out the invention in one form thereof, a laminated armature is secured in fixed position with respect to the case of the geophone. A pair of coils each having laminated cores form a part of an inertia assembly within the case. The laminated iron cores are supported with respect to the armature so as to provide flux paths for the coils, each flux path including a relatively narrow air gap. Upon movement by seismic waves of the geophone case, the armature is moved to decrease the air gap of one coil while increasing the air gap in the magnetic circuit of the other coil. The air gaps are sufficiently narrow as to produce relatively large changes in inductance upon variation by the seismic waves. Hence, by impressing a high frequency carrier current across the coils, preferably by means of a bridge circuit, the carrier current is modulated in sympathy with the seismic waves.

It will be seen that a geophone constructed in accordance with the present invention does not rely upon magnets and their associated magnetic circuit for its operation. A geophone including a permanent magnet is in effect a generator of electric signals. It is an active signal generator. The geophone of the present invention is not an active generator of electric signals. Its function is passive. It modulates the carrier current by reason of substantial changes in the inductance of the coils, one in one direction and the other in the other direction.

For a more detailed explanation of the invention, and for further objects and advantages thereof, reference is to be had to the following detailed description, taken in conjunction with the accompanying drawings, in which.

Figure 1:
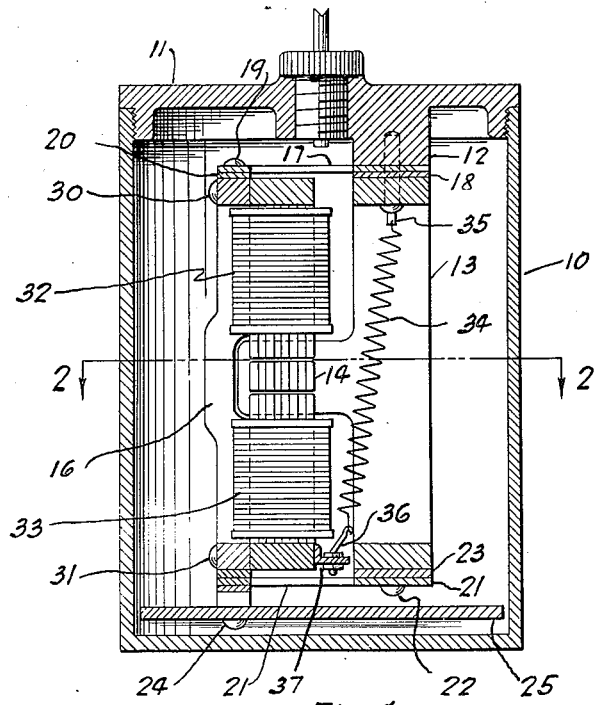
Fig. 1 is a vertical sectional view of the device forming the subject matter of this application taken along the lines of 1—1 of Fig. 2.

Referring to the drawings, the invention in one form is shown as applied to a geophone having a cylindrical casing 10. The top portion of the cylindrical casing is interiorly threaded to receive a closure 11. The closure 11 has a depending ledge or abutment 12 to which there is securely attached a yoke 13 which forms a supporting frame for the armature 14.

The armature 14 comprises a plurality of laminations formed of a material having high magnetic permeability and low residual magnetism. It extends between the arms 13a and 13b of the frame 13, and is held in place by means of screws 15, Figs. 2 and 3.

Figure 3:
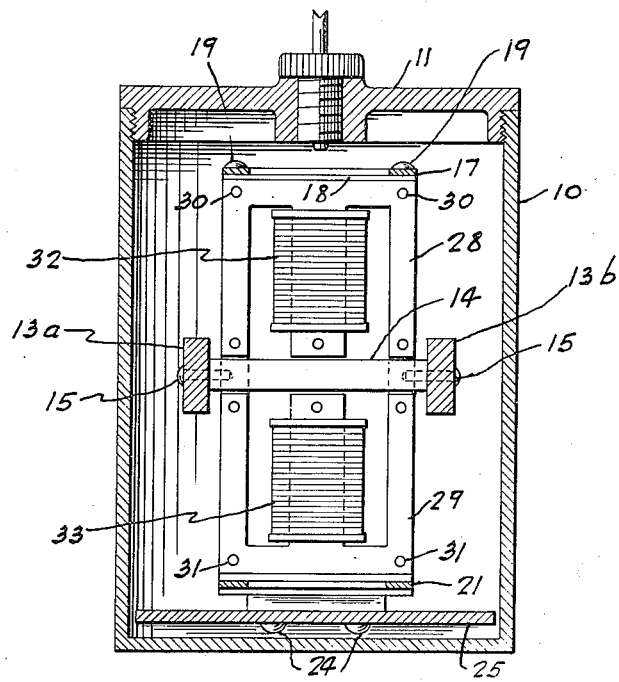
Fig. 3 is a vertical elevation, showing the housing in section, taken on the lines 3—3 of Fig. 2.

The inertia assembly, Fig. 3, comprises a frame 16 supported at the top by means of a leaf spring 17 having a rectangular mid-portion thereof cut away to provide resilient arms 17a and 17b. One end of the spring 17 is provided with openings through which screws may extend. These screws (not shown) are preferably the same as those which extend through the openings 13d of the frame 13, and which threadedly engage the supporting ledge 12. In this manner one end of the leaf spring 17, Fig. 1, is clamped between the ledge 12 and the upper end of the yoke 13. A lamination 18 is inserted between the clamped end of the leaf spring 17 and the upper end of the yoke 13. The outer and free end of the leaf spring 17 is provided with openings through which screws 19 extend. These screws threadedly engage the frame 16, a lamination 20 being provided between the upper end of the frame and the free end of the leaf spring. A second leaf spring 21, preferably identical with the leaf spring 17, has one end clamped to the lower end of the yoke or frame 13 by means of screws 22, Fig. 1, with a lamination 23 inserted between the clamped end of the leaf spring and the lower end of the yoke 13. The outer free end of the leaf spring 21 is secured to the lower end of the frame 16 by means of screws 24 which extend through a damping disc 25, a spacing bar 26, a lamination 27, the free end of the spring 21, a second lamination 27, and into threaded engagement with the lower end of frame 16. In this manner the frame 16 of the inertia assembly is resiliently supported by means of the leaf springs 17 and 21.

Figure 4:
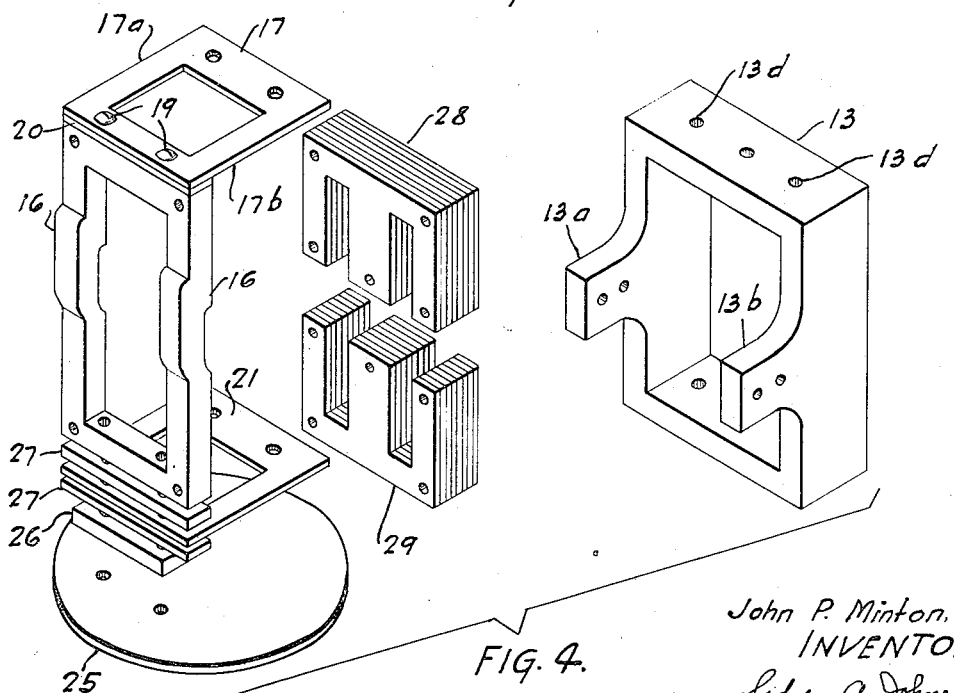
Fig. 4 is a disassociated perspective view of certain of the working elements of the detecting device.

The inertia assembly also comprises two groups of E-shaped laminations 28 and 29 formed of a material having high magnetic permeability and low residual magnetism. These laminations are carried by the frame 16. They are secured to it by means of fastening screws, two of which, the screws 30 and 31, are shown in Fig. 1. The fastening screws extend through the spaced horizontal holes shown at the top and the bottom of the frame 16 in Fig. 4 and into threaded engagement with the laminations 28 and 29. It will be observed, Figs. 1, 3 and 4, that the legs of each E-shaped group of laminations are directed toward each other. The space between the ends of the corresponding legs of the two groups 28 and 29 is largely filled by the laminated armature 14. Its laminations are parallel to the E-shaped laminations 28 and 29.

Around the center arms of the E-shaped laminations 28 and 29 are disposed coils 32 and 33. These coils may be spool-wound or they may be wound directly around the central leg or arm of the E-shaped laminations. They are securely held in place, as by frictional engagement with each center arm, and thus form a part of the inertia assembly.

Figure 2:
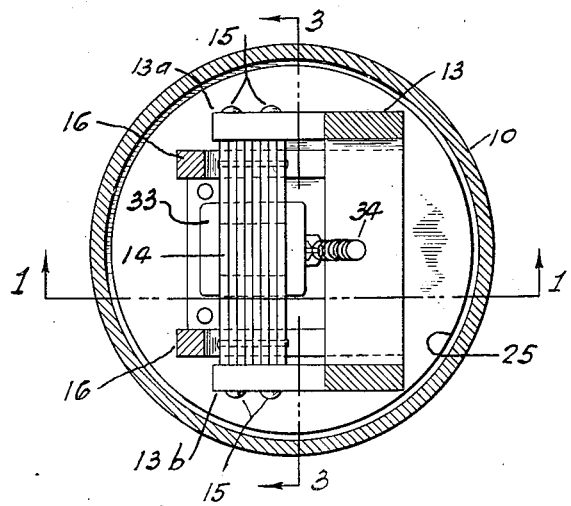
Fig. 2 is a cross sectional view taken along the lines 2—2 of Fig. 1.

In order equaly to space the E-shaped laminations 28 and 29 on opposite sides of the armature 14, there is provided Figs. 1 and 2, a weight or gravity compensating spring 34, one end of which is fastened to the upper end of the yoke 13 or to the case 10 by means of a threaded stud 35, which threadedly engages the ledge 12. The other end of the spring 34 is fastened to a hook-shaped member 36, carried by an angle 37, secured to the lower end of the frame 16. The hook-shaped member 36 is threaded and is secured to the angle 37 by means of nuts, one above and one below the angle. By adjusting the tension of the spring 34, by means of the adjusting nuts, the weight of the inertia assembly can be sufficiently compensated to take the load from the leaf springs 17 and 21 and to insure the centering of the armature 14 mid-way between the laminations 28 and 29.

The groups of laminations 28 and 29 form cores for the coils 32 and 33, and with the armature 14 form separate flux circuits for each coil. Movement of the armature 14 relative to the inertia assembly produces a change in the inductance of coils 32 and 33 in such a manner that as the inductance in one coil increases, the inductance in the other coil decreases. As best seen in Fig. 3, each flux circuit extends from one side of each coil through the central leg or arm of each laminated core, through a relatively narrow air gap, thence through the laminated armature 14, and through relatively narrow air gaps to the outer arms or legs of each core, and thence to the other side of each coil. Since each flux path divides at the center leg, the center arm or leg preferably has twice the cross-sectional area of one of the outer legs or arms. To provide for a substantial change of inductance upon relative movement between the armature 14 and the cores 28 and 29, each air gap is relatively small or narrow, of the order of five thousandths of an inch between the armature and the face of each leg of each core.

Figure 5:
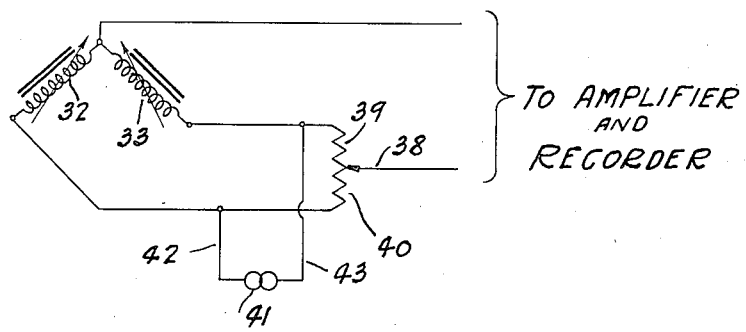
Fig. 5 is a diagrammatic wiring diagram of a bridge circuit including the coils of the geophone.

The change in the inductance of the coils 32 and 33 is utilized to modulate a high frequency carrier current. Referring to Fig. 5, there is diagrammatically illustrated a preferred electrical system. The coils 32 and 33 form two arms of a reactance bridge circuit, the other two arms comprising a resistor divided by a contactor 38 into two sections, 39 and 40. A high frequency carrier current from a source 41 is impressed across the bridge by means of the leads 42 and 43. This carrier current wave is modulated in sympathy with the seismic waves by movement of the armature relative to the inertia assembly to produce a change in the inductance of the coils 32 and 33. The modulated carrier current is then in a conventional manner fed into an amplifier, rectified and recorded. These conventional connections are indicated in Fig. 5 by the bracket labeled "To amplifier and recorder." Preferably the reactance bridge is moved to vary the values of the resistors 39 and 40 until the bridge is in balance.

The geophone is itself located or planted in conventional manner. It may be utilized as an uphole geophone located at a shotpoint, or a plurality of geophone constructed in accordance with the invention may be distributed in conventional manner to form a spread. Seismic waves, which may be produced by the detonation of a charge of explosive upon arrival at each geophone, produce movement of the geophone case in sympathy therewith. Because the armature 14 is rigidly carried by the casing 10 and its closure 11, these small movements cause the armature to change the air gaps between the armature and the respective cores 28 and 29. As the casing is moved upwardly, the air gaps between the armature 14 and the core 28 decrease. Simultaneously, the air gaps between the armature and the core 29 increase. Hence the change in the inductance of the coil 32 is in one direction, and the change in the inductance of the coil 33 is in the opposite direction. This double change in inductance produces substantial modulation of the carrier wave in sympathy with the seismic waves whether they be direct travelling waves, or reflected waves.

The leaf springs 17 and 21 absorb the relatively minute movements of the casing 10 and prevent corresponding movements of the inertia assembly. In other words, the relatively heavy mass comprising the two cores 28 and 29, their coils 32 and 33, and the frame 16 remains at standstill.

Figure 6:
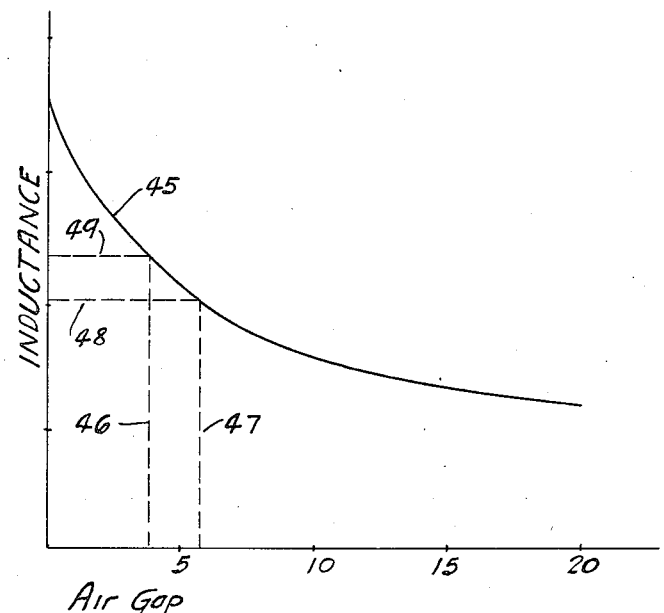
Fig. 6 is a graph illustrating change of inductance of a coil with reference to change in the air gap between the core of the coil and the armature thereof.

Compressional seismic waves may be compared with sound waves. They are analogous in that they comprise compressional waves in the earth's surface which result in the aforesaid movements of the geophone casing 10 and the armature 14. Because the movements are relatively minute, a sensitive detector must be used. In accordance with the present invention the doubling effect of the change of inductance in opposite directions is supplemented by providing relatively narrow air gaps between the armature 14 and the respective cores 28 and 29. Thus the graph 45 of Fig. 6 illustrates the change in inductance as ordinates against the change in air gap as abscissae. These air gaps (the spacing between the armature 14 and the cores 28 and 29) are preferably less than ten thousandths of an inch. The preferred spacing is around five thousandths of an inch. As indicated by the vertical broken lines 46 and 47, a change in the air gaps of one coil of two thousandths of an inch produces a change in the inductance, as indicated by the horizontal lines 48 and 49, of approximately seventeen thousandths of a henry. By operating on the indicated portion of the graph or curve 45, a substantial linear response is obtained. In other words, the movement of the geophone casing 10 in response to seismic reflections will be of the order of ten microinches. With a movement of this order the curve 45 will be substantially linear, yet there will be a substantial change in inductance because of such movements. However, if the spacing is excessive, above fifteen or twenty thousandths of an inch, it will be observed there will be very little change of inductance even for large changes in the air gap. Above twenty thousandths of an inch for each air gap movements of the magnitude produced by seismic reflections would produce negligible changes in inductance and less than would satisfactorily produce modulation of the carrier.

It is therefore an important part of the present invention to provide air gaps which are sufficiently narrow as to insure a substantial increase in the inductance of one coil, while at the same time producing a substantial decrease in the inductance of the other coil. The air gaps must be sufficiently narrow that upon relative movement between the inertia assembly and the armature there is a change adequate to produce satisfactory modulation of the carrier current.

The carrier current preferably has a frequency materially higher than the relatively low frequency seismic waves to be detected. The carrier frequency may be of the order of one thousand cycles per second. With this relatively high frequency it is necessary that the respective sets of laminations 14, 28 and 29 be formed of materials having high magnetic permeability, the higher the better. This requirement is in contrast with geophones in which permanent magnets have been utilized. The permeability of a permanent magnet is of the order of four to five whereas the permeability of a good grade of laminated transformer iron or steel is of the order of one thousand or more.

Because of the relatively small air gaps involved, damping of the inertia assembly is critical since any residual vibration would materially affect subsequent seismic vibrations to be recorded. In order to avoid interference of this character, there is provided the damping disc 25, carried by the frame 16 of the inertia assembly. This disc forms, with the inner wall of the cylindrical case 10, a narrow circumferential gap. This gap may be made sufficiently small so as to provide satisfactory air damping by placing disc 25 close to the bottom of casing 10. Specifically, the disc 25 will function like a piston in a cylinder and relative movement will be resisted by the flow of air through the narrow gap. The spacing between the disc and the bottom of casing 10 may be adjusted by changing the thickness of the lamination 27, or by inserting additional laminations.

Preferably oil damping is used since the dimensions and clearances are not as critical, and in such a case a very small amount of oil will be utilized, only sufficient to fill the space between disc 25 and the bottom of the casing and to just immerse the disc. In this manner the amount of oil utilized is such that there is not enough oil present to make it likely that any will find its way into the air gaps of the magnetic structure. In other words there is not enough oil present to be splashed about in the casing during transportation or use, and so long as the geophone is transported in its normal vertical position, oil damping may be successfully utilized.

While a preferred embodiment of the invention has been described, it will be understood that modifications may be made without departing from the true spirit and scope of the invention as set forth in the appended claim.

What is claimed is:

A device for detecting seismic waves comprising an armature formed of a plurality of laminations of a material having high magnetic permeability and low residual magnetism, a rigid frame having spaced portions, means for rigidly securing opposite ends of said armature to said spaced portions with said armature disposed in a horizontal position and movable vertically by application of seismic waves to said frame, an inertia assembly including a pair of E-shaped cores formed of a plurality of laminations of a material having high permeability and low residual magnetism, said assembly including spring means supporting one of said cores on the upper side of said armature and the other of said cores on the lower side of said armature with very narrow air gaps between each leg of each core and said armature and with the laminations thereof parallel to those of said armature, said spring means having characteristics such as to eliminate movement of said cores upon application of said seismic waves to said frame, said assembly including a coil encircling each of said cores, said narrow air gaps being of the order of ten thousandths of an inch for producing operation on the steeper slope of the characteristic curve between inductance and air gap so that upon relatively minute movements between said cores and said armature produced by said seismic waves there occurs a substantial change in inductance of one coil in on direction and simultaneously a substantial change of inductance in the other coil in the opposite direction, said armature and said cores providing for bodily vertical movement by said seismic waves of said armature simultaneously and substantially uniformly to change the air gaps between the said legs of each of said cores and said armature.

JOHN P. MINTON.